Figure 1:
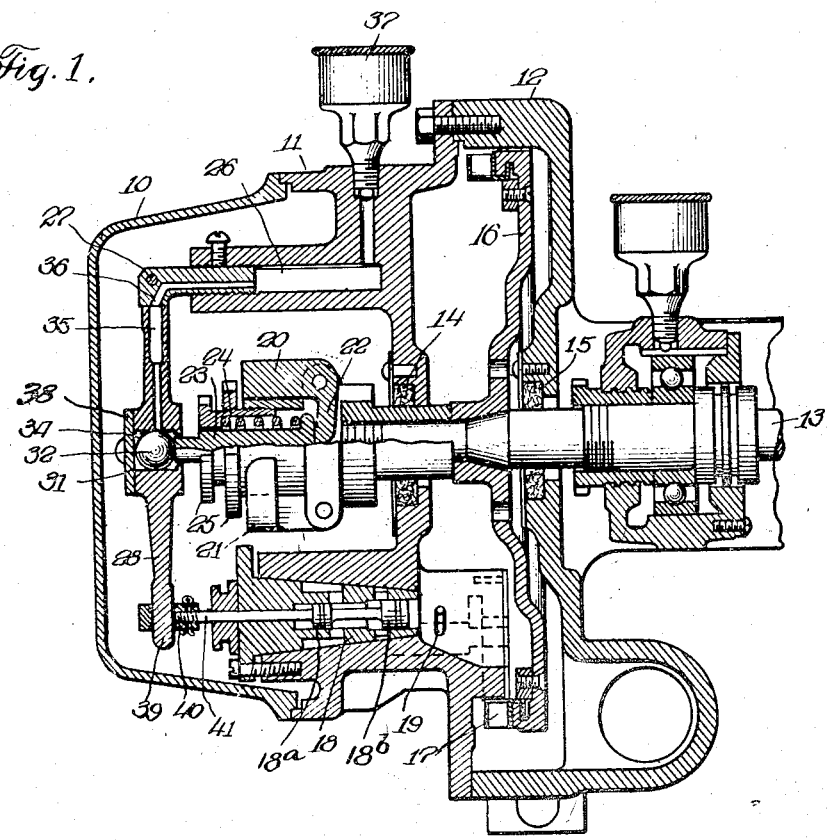

July 10, 1928.

L. B. JONES ET AL 1,676,902

GOVERNOR

Original Filed Aug. 5, 1920

Inventors
Lee B. Jones,
Edward H. Werzner
By Jones, Addington, Ames & Seibold
Attys.

Patented July 10, 1928.

1,676,902

UNITED STATES PATENT OFFICE.

LEE B. JONES AND EDWARD H. WERZNER, OF EVANSVILLE, INDIANA, ASSIGNORS TO SUNBEAM ELECTRIC MANUFACTURING COMPANY, OF EVANSVILLE, INDIANA, A CORPORATION OF INDIANA.

GOVERNOR.

Application filed August 5, 1920, Serial No. 401,537. Renewed December 5, 1927.

Our invention relates to governor mechanism and it has particular relation to an apparatus of the character described which is responsive to the speed of the machine governed to directly control the admission of motive fluid to said machine.

One object of our invention is to provide, in combination with governing mechanism, a novel form of governor lever embodying such characteristics that it is exceptionally durable as well as simple in construction. In this connection we also provide means whereby the contact between the governing mechanism and the aforesaid lever takes place upon a hardened bearing.

We so dispose this bearing in a seat in the lever that it may be constantly lubricated irrespective of the motion of the lever. Moreover, we provide, in conjunction with the aforesaid ball seat in the lever, a removable and reversible wear-plate. Such provision results in substantially doubling the life of the governor lever inasmuch as the ball is so arranged that it contacts against said plate and after the plate is worn it may be removed and so reversed that the other side thereof receives the impact of the ball.

Figure 2:
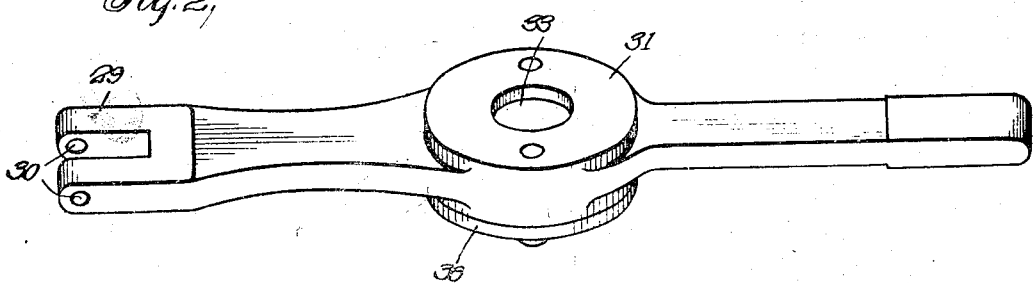

Referring to the drawings for a better understanding of our invention:

Fig. 1 is an elevational sectional view of a fluid-driven turbine embodying our governor mechanism; and Fig. 2 is a perspective view of the governor lever which is utilized in said governor.

The turbine comprises a casing consisting of three parts, 10, 11 and 12 which are secured together to provide appropriate operating chambers. A shaft 13 is journalled in the casing parts 11 and 12 at 14 and 15, and secured to said shaft is a rotor 16 provided with fluid-receiving buckets 17.

The rotor is supplied with motive fluid through a valve 18 which, by its longitudinal movement, opens and closes appropriate ports whereby the supply of steam is effectively governed. A pin 19 cast integrally with the casing limits the movement of the movable portion of the valve to the right.

Pivotally mounted on the shaft 13 are weighted bell-crank arms 20 and 21. When the weighted outer arms are urged outwardly by centrifugal force the other arms 22 travel to the left and force a member 23 in the same direction against the action of the spring 24, the latter being held in position by members 25 which are screwed into the governor casing.

The turbine casing portion 11 has formed integrally therein an oil channel 26 at the end of which is secured a channeled supporting member 27. Pivotally mounted on the member 27 is a lever 28 which is so secured to said member that it oscillates in the plane of the paper.

The lever 28 is formed at one end with a yoke portion 29 which engages the member 27 in equitant relation and is secured thereto by passing a pin through the holes 30. Intermediate the ends of the lever is formed a ball seat 31 provided with apertures at both sides of the lever. A ball 32 is seated in the socket 31 and is of such size that it cannot pass through one aperture 33 but may be passed through another aperture 34. Extending longitudinally of the lever is an oil channel 35 which terminates at one end in proximity to the end of an oil channel 36 formed in the member 27 and at the other end in the socket 31 whereby a lubricant may be supplied to the ball socket from an oil cup 37 which supplies the oil channel 26.

A plate 38 covers the larger aperture 34 and is so secured to the lever that, after being worn by the ball 32, it may be reversed and the other side thereof presented to the impact of the ball. The lower end 39 of the lever extends into a slotted portion 40 of a valve-opening-and-closing member 41.

Having described the manner in which the various governing instrumentalities are arranged, the operation thereof is more or less apparent.

As the turbine speeds up the arms 20 and 21 move outwardly whereby the inner arms 22 urge the member 23 to the left against the action of the spring 24. The end of the member 23 passes through smaller aperture 33 and impacts upon the ball 32 thereby swinging the lever 28 about its point of pivotal support and causing the valve-opening-and-closing pistons to move.

The valve comprises pistons $18^a$ and $18^b$ which are of unequal areas, the latter being of slightly larger diameter. The steam enters the valve between said pistons whereby said valve is constantly urged to the right or in such direction that the ball 32 is maintained in firm contact with the governor stem 23. This is a feature of importance in that it is unnecessary to provide a spring to move the valve when the speed of the machine is reduced. In other words, the slight over-balancing of the valve co-operates in a desirable manner with the governor to keep the elements of the latter in close contact.

The particular construction of the lever heretofore described and especially the provision of a removable and reversible ball plate produces a governor lever which is extremely durable and efficient in operation. The particular method of lubricating the ball promotes, to a large degree, the smooth running operation of the turbine inasmuch as the governor is rendered extremely sensitive by reason of the particlar arrangement referred to.

While we have described but one embodiment of our invention it is obvious that many modifications therein may occur to those skilled in the art and we desire, therefore, that or invention be considered in its broadest aspects and limited only by the showing of the prior art and by the scope of the appended claims.

Having thus described our invention what we claim as new and desire to secure by Letters Patent is:

1. In a governing mechanism, a rotary shaft, pivoted bell cranks associated therewith, one arm of which is responsive to centrifugal force and the other arm of which is moved thereby substantially parallel to said shaft, a pivotal valve-actuating lever adapted to be moved through said last named arms, said lever having a ball socket formed therein and having a removable wear plate at one side of said socket, a freely movable ball loose within said socket and capable of turning to present all parts of its surface to said plate, and a valve associated with said lever.

2. In a governing mechanism, a rotary shaft, pivoted bell cranks associated therewith, one arm of which is responsive to centrifugal force and the other arm of which is moved thereby substantially parallel to said shaft, a pivoted valve-actuating lever adapted to be moved through said last named arms, said lever having a ball socket formed therein, said socket being open at both sides of said lever, and a removable wear plate covering one of said openings, and a valve associated with said lever.

3. In a governing mechanism, a rotary shaft, pivoted bell cranks associated therewith, one arm of which is responsive to centrifugal force and the other arm of which is moved thereby substantially parallel to said shaft, a pivoted valve-actuating lever adapted to be moved through said last named arms, said lever embodying a socket and a ball adapted to be seated therein, said socket being open at both sides of the lever and said ball being withdrawable through one of said openings, a removable and reversible wear plate overlying said last named opening, and means whereby said last named arms act upon said ball to move said lever about its pivotal point.

4. In a governing mechanism, a rotary shaft, pivoted bell cranks associated therewith, one arm of which is responsive to centrifugal force and the other arm of which is moved thereby substantially parallel to said shaft, a pivoted valve-actuating lever adapted to be moved through said last named arms, said lever embodying a socket and a ball adapted to be seated therein, said socket being open at both sides of the lever and said ball being withdrawable through one of said openings, and said lever having a passage formed therein whereby lubricant may be supplied to said ball socket, a removable and reversible wear plate overlying one of the openings, said plate receiving the direct thrust of said ball, and means whereby said last-named arms act upon said ball to move said lever about its pivotal point.

5. In a governing mechanism, a rotatable shaft, means responsive to the speed of said shaft and comprising a rod movable substantially parallel to said shaft, and a pivoted valve actuating lever adapted to be moved by said rod, said lever having a ball receiving socket formed therein, a freely movable ball loose within said socket and capable of turning to present all parts of its surface to a removable and reversible wear plate at one side and being retained on the opposite side by an apertured portion of said lever, said rod extending through said aperture and pressing said ball against the wear plate to move said lever around its pivot.

6. In a governing mechanism, a rotary shaft, pivoted bell cranks associated therewith, one arm of which is responsive to centrifugal force and the other arm of which is moved thereby substantially parallel to said shaft, a pivoted valve-actuating lever adapted to be moved through said last named arms, said lever embodying a socket and a ball adapted to be seated therein, said socket being open at both sides of the lever and said ball being withdrawable through one of said openings, a removable and reversible wear plate overlying one of said openings, and means comprising a spring retained member adapted to be moved by said last-named arms, one end of said member pressing said ball against said plate to move said lever.

7. In a turbine, a governing mechanism comprising a pivoted lever having a socket and a passage for lubricant extending from said socket to adjacent the point of support of said lever formed therein, a ball in said socket, a wear plate covering one side of said socket and against which said ball contacts, said lever having an engaging portion at the end remote from the pivotal support, and a valve comprising a movable member having a portion engaged and moved by said lever engaging portion.

8. In a governing mechanism, a rotatable shaft, means responsive to the speed of said shaft and comprising a rod movable substantially parallel to said shaft, and a pivoted valve actuating lever adapted to be moved by said rod, said lever having a ball receiving socket formed therein, said socket being open at both sides of said lever, a ball bearing seated in said socket, a removable wear plate extending over one side of said socket and providing a bearing surface against which said ball may press, a ball retaining portion of said lever disposed at the opposite side of said ball from said plate, an aperture being formed in said portion, and said rod extending through said aperture and pressing said ball against the wear plate to move said lever around its pivot.

9. In a governing mechanism, a lever formed with a yoke at one end, said yoke being adapted for support through the arms thereof, a socket formed in said lever and having openings at both sides thereof, a ball adapted to seat in said socket and to pass through one of said openings but not through the other opening, a removable wear plate covering said first-named opening, and a passage formed in said lever and extending from between said yoke arms to said ball socket whereby lubricant may be supplied to the latter therethrough.

10. In a governing mechanism, a lever formed with a yoke at one end, said yoke being adapted for support through the arms thereof, a socket formed in said lever and having openings at both sides thereof, a ball adapted to seat in said socket and to pass through one of said openings but not through the other opening, a removable and reversible wear plate covering said first-named opening, and a passage formed in said lever and extending from between said yoke arms to said ball socket whereby lubricant may be supplied to the latter therethrough.

11. In a governing mechanism, a lever formed with a yoke at one end, said yoke having arms perforated in a direction so that said yoke may engage a supporting member in equitant relation and be supported by the passage of a pin through perforations and said supporting member, a socket formed in said lever and having openings at both sides thereof, a wear plate over one of said openings, a ball adapted to seat in said socket against said plate and to pass through one of said openings but not through the other opening, and a passage formed in said lever and extending from between said yoke arms to said ball socket whereby lubricant may be supplied to the latter from means associated with said supporting member.

12. In a governing mechanism, a lever having a socket formed therein, which has openings on both sides of said lever, a ball adapted to loosely seat in said socket and to pass through one of said openings but not through the other, and a removable member against which said ball contacts covering said first-named opening.

13. In a governing mechanism, a movable lever having a pocket formed therein, a ball received in said pocket, a speed-controlled movable stem contacting with said ball, a valve comprising a port opening and closing member, moved by said lever, and means associated with said valve opening and closing member to insure the constant contact of said stem and ball.

14. In a governing mechanism, a movable lever having a pocket formed therein, a ball received in said pocket, a speed-controlled movable stem contacting with said ball, and a valve comprising pistons of unequal area having fluid fed therebetween, said pistons being mounted on a rod moved by said lever, whereby said rod is constantly urged in one direction and close contact maintained between said stem and lever.

In witness whereof, we have hereunto subscribed our names.

LEE B. JONES.
EDWARD H. WERZNER.